United States Patent [19]

Ortloff

[11] Patent Number: 4,671,544
[45] Date of Patent: Jun. 9, 1987

[54] SEAL FOR THREADED PIPE CONNECTION
[75] Inventor: Donald J. Ortloff, Houston, Tex.
[73] Assignee: Hydril Company, Houston, Tex.
[21] Appl. No.: 787,662
[22] Filed: Oct. 15, 1985
[51] Int. Cl.$^4$ ............................................. F16L 25/00
[52] U.S. Cl. ................................ 285/334; 285/332.2;
285/355; 285/351
[58] Field of Search ............... 285/334, 333, 355, 390,
285/347, 351, 332.3, 332.2

[56] References Cited
U.S. PATENT DOCUMENTS

| Re. 30,647 | 6/1981 | Blose | 285/332.2 |
|---|---|---|---|
| 2,907,589 | 10/1959 | Knox | 285/95 |
| 2,980,451 | 4/1961 | Taylor et al. | 285/332.3 |
| 3,047,316 | 7/1962 | Wehring et al. | 285/334 |
| 3,989,284 | 11/1976 | Blose | 285/334 X |
| 4,192,533 | 3/1980 | Blose | 285/334 |
| 4,433,862 | 2/1984 | Raulins et al. | 285/350 |
| 4,458,925 | 7/1984 | Raulins et al. | 285/332.2 |
| 4,489,963 | 12/1984 | Raulins et al. | 285/350 |
| 4,496,175 | 1/1985 | Morris | 285/334 |
| 4,537,429 | 8/1985 | Landriault | 285/334 |
| 4,577,895 | 3/1986 | Castille | 285/334 |

FOREIGN PATENT DOCUMENTS 127560 12/1984 European Pat. Off. ......... 285/332.3

Primary Examiner—Richard J. Scanlan, Jr.
Attorney, Agent, or Firm—Vaden, Eickenroht, Thompson & Boulware

[57] ABSTRACT

A threaded pipe connection is disclosed having tapered sealing surfaces between the ends of the threads on the box and pin that engage and a resilient seal member located in a groove about midway between the ends of one of the surfaces to form a seal with the other surface when the joint is made up with the two surfaces forming independent metal-to-metal seals on both sides of the resilient seal member.

15 Claims, 5 Drawing Figures

FIG. 4
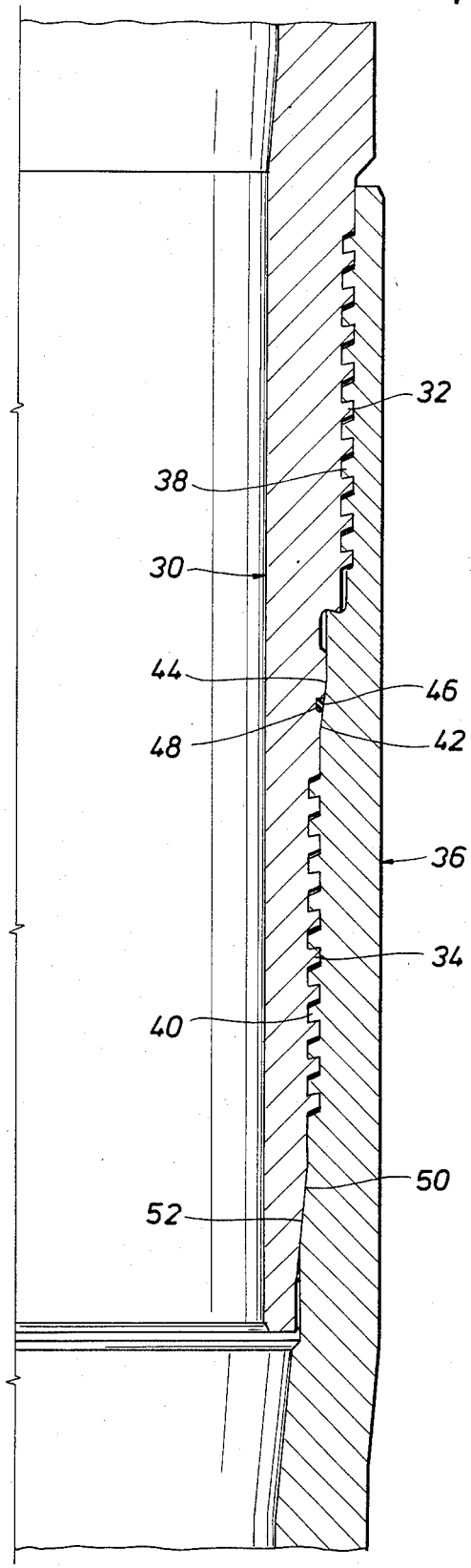
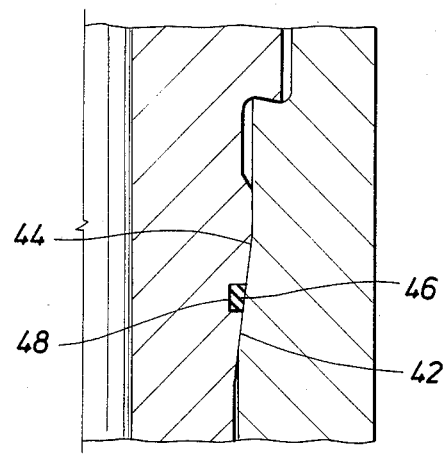
FIG. 5

SEAL FOR THREADED PIPE CONNECTION

This invention relates to threaded pipe connections, or as they are often called "threaded pipe joints", for oil country tubular goods and in particular to an improved seal arrangement for such connections.

Threaded pipe connections for oil country tubular goods use metal-to-metal seals to keep the connections from leaking. Some connections also use resilient seal rings, but in all cases the primary seal is a metal-to-metal seal. This is because seal rings of resilient material deteriorate at high temperatures, are easily damaged in handling, and will extrude under high pressure. Another reason why resilient seal rings are not commonly used in pipe joints is that preferably they are carried by the pin and this requires a groove. It is well known that the maximum stress in a member will occur at any abrupt change in cross-section, such as a groove. Therefore, where such grooves and resilient seal rings are used, they are located in a section of the pin or box having the thickest possible wall section. An example of this is shown in U.S. Pat. No. 4,458,925 which issued July 10, 1984 and is entitled "Pipe Joint". There, the groove for the resilient ring is located below the threads in the box in a section of the box or coupling having a wall section thickness approaching that of the pipe and therefore will not weaken the joint substantially.

According to this invention, however, it has been determined that mating metal-to-metal tapered or conical surfaces located between the ends of the threads of a threaded pipe connection can accommodate a groove in one of the surfaces without unduly weakening the joint. Therefore, it is an object of this invention to provide such a connection having conical or tapered mating surfaces located between the ends of the threads and having a groove located in one of the surfaces in which a resilient seal member is located to engage the other surface and form a seal with the two surfaces forming metal-to-metal seals on opposite sides of the seal provided by the resilient member.

It is a further object of this invention to provide such a connection having relatively long mating sealing surfaces between the ends of the threads that taper at a relatively small angle to produce high normal forces on the surfaces as the connection is made up with a resilient seal member located in a groove about midway between the ends of the mating surfaces to form a seal independent of the metal-to-metal seals formed by the surfaces on each side of the resilient seal member. These and other objects, advantages, and features of this invention will be apparent to those skilled in the art from a consideration of this specification, including the attached drawings and appended claims.

IN THE DRAWINGS

FIG. 4 is a view in cross-section of a connection embodying this invention having straight or cylindrical threads that are divided into a large step with the small step having a major diameter and a minor diameter smaller than the major diameter and minor diameter of the large step; and FIG. 5 is a cross-sectional view, on an enlarged scale, of the seal area.

Figure 1:
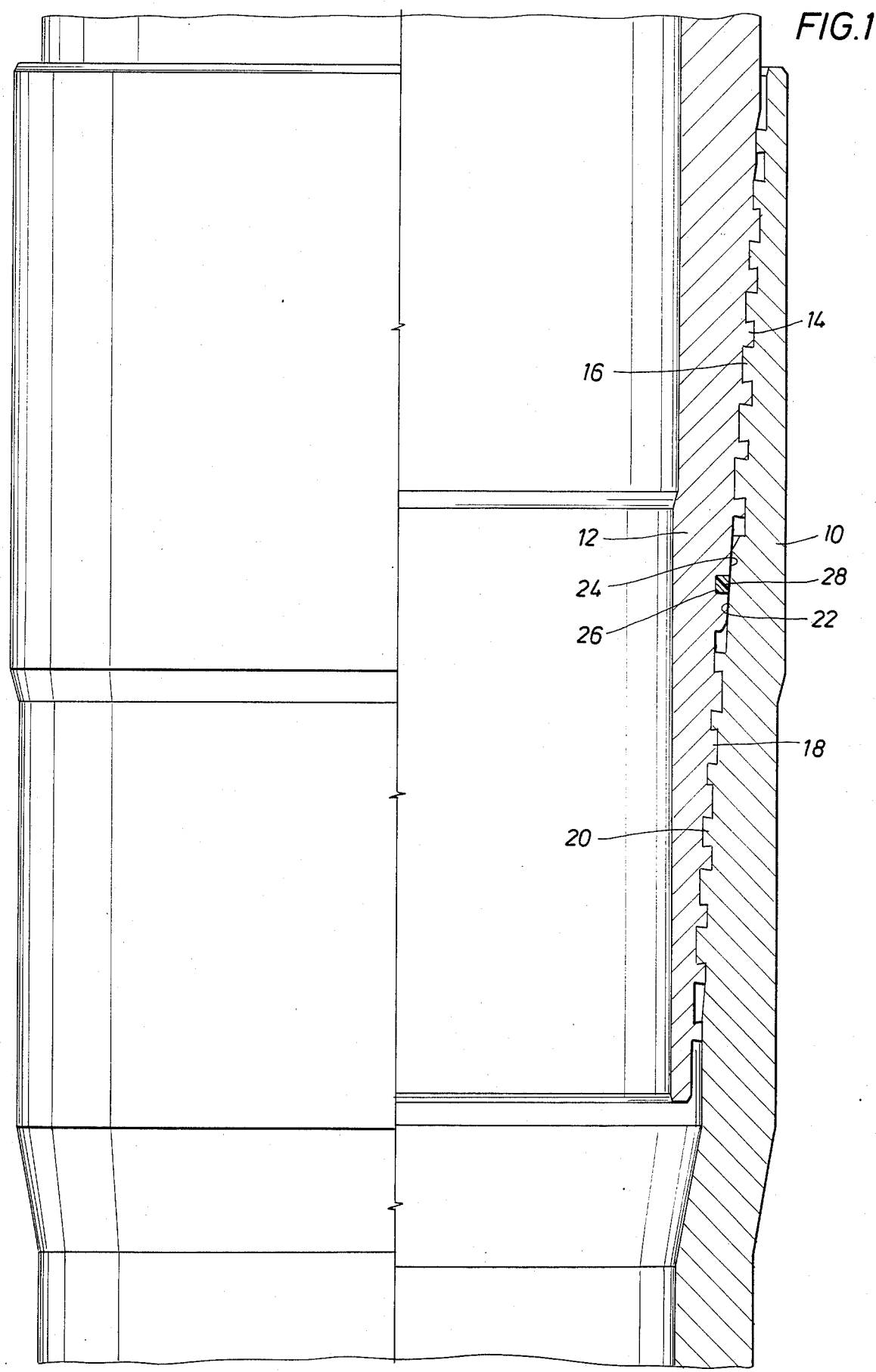
FIG. 1 is a view partly in cross-section and partly in elevation of a connection embodying this invention having two steps of tapered wedge threads.

The connection shown in FIG. 1 includes box 10 and pin 12. The threads are wedge-shaped and increase in width in one direction on the pin and the opposite direction on the box so that when the joint is made up, the threads will lock the pin and box together and also form a seal between the flanks of the threads and the roots and crests of the threads. This is the Series 500 wedge thread manufactured and sold by the Hydril Tubular Division of The Hydril Company.

In the connection shown, the threads are stepped having large steps 14 and 16 on the pin and box and small steps 18 and 20 on the box and pin. The threads of the large steps have major and minor diameters larger than the major and minor diameters of the threads on the small steps. Located on the pin and box about midway between the ends of the threads and between the steps are tapered surface 22 on the box and tapered surface 24 on the pin. The surfaces engage and form a metal-to-metal seal to provide an additional seal for the joint over and above the seal formed by the mating wedge-shaped threads. Preferably the surfaces taper at about two to four degrees from the longitudinal axis of the connection resulting in large normal forces on the surfaces when the joint is made up.

Figure 3:
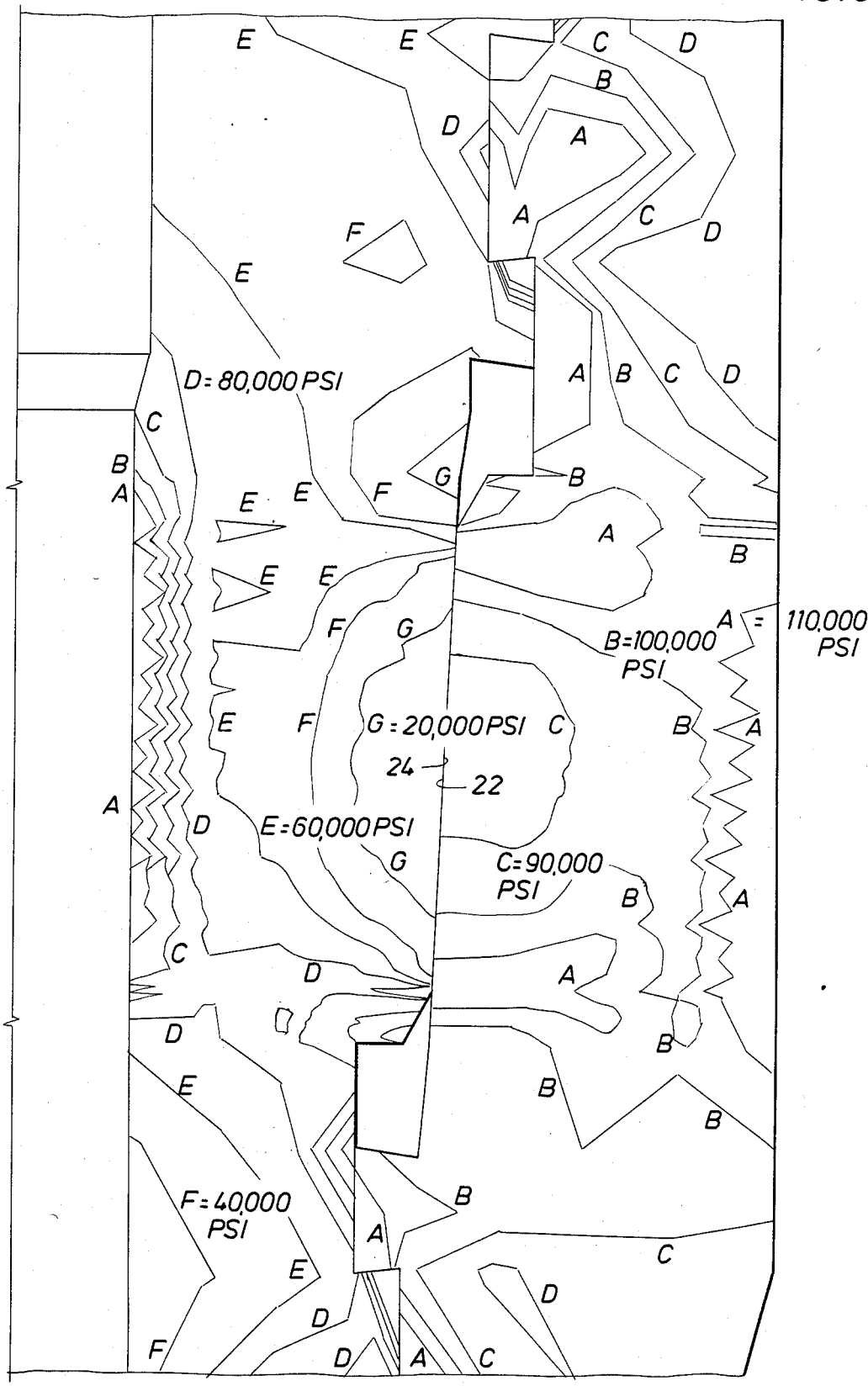
FIG. 3 is a computer printout of the same portion of the connection showing the stresses produced without the a groove.

While running a computer generated stress analysis on this joint, the stress lines shown in FIG. 3 were produced in a 7" casing joint of the type shown in FIG. 1 when subjected to both axial stress and radial stress due to internal pressure. The computer was programmed for 7" diameter P-110 casing, 29 lbs. per foot, an internal pressure of 11,220 psi, and an axial tensile load of 667,505 lbs. which is 80% of the tensile strength of the pipe. The result is shown in FIG. 3. High stress concentrations were indicated adjacent both ends of the mating surfaces over relatively small areas. This is shown by the area A, which is 110,000 psi. The stress tapers off toward the middle, dropping to C which is 90,000 lbs., in the box and to G, which is 20,000 lbs., in the pin. Thus, even though the mating conical surfaces are relatively long and the taper of the surfaces is intended to produce high normal forces, only two areas of high stress are produced and these are located adjacent the ends of the mating surfaces. It is in these areas that the metal-to-metal seal is formed. The middle portions of the mating surfaces were not highly stressed and were really contributing nothing to the seal between the box and the pin.

Figure 2:
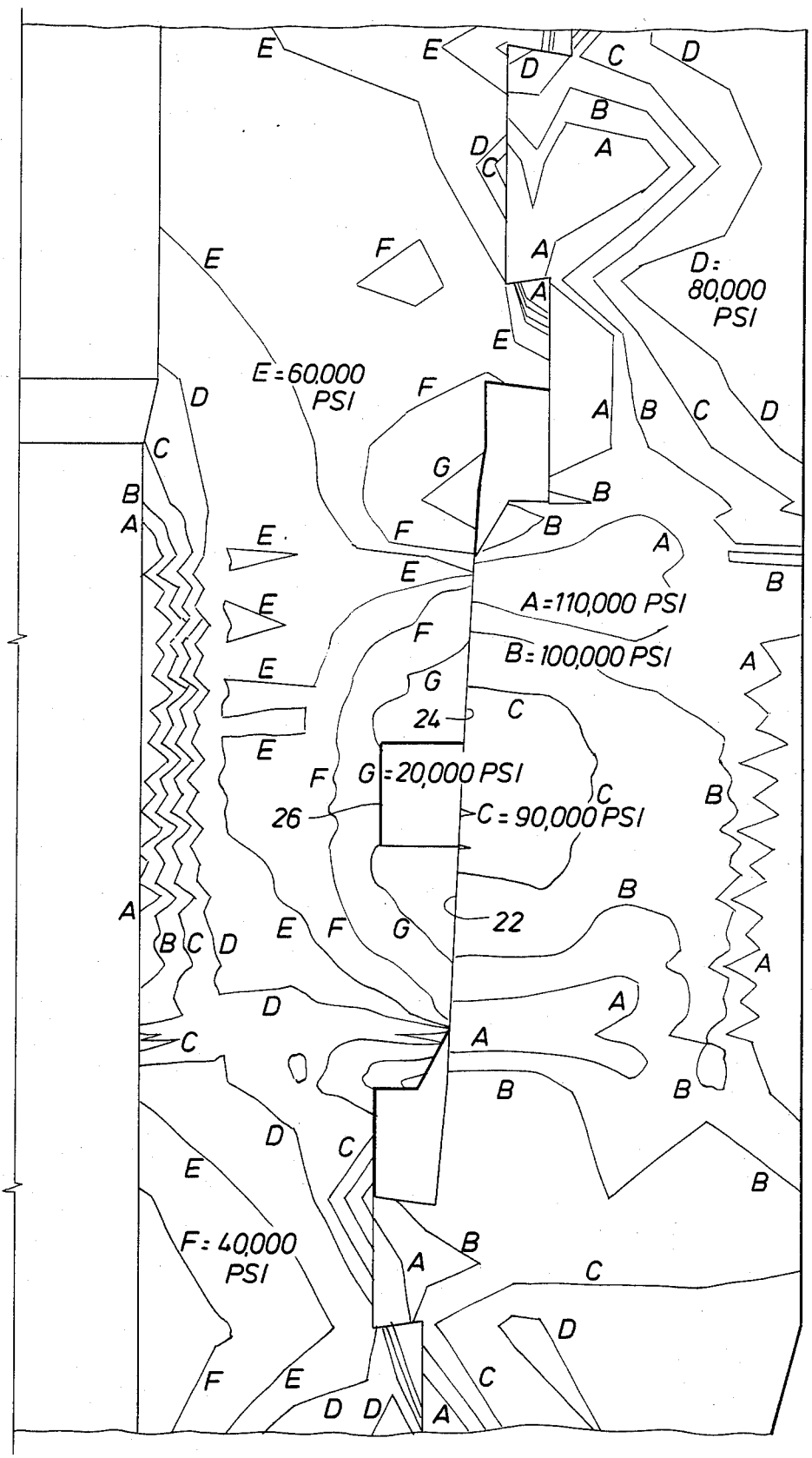
FIG. 2 is a computer printout of the stresses produced in the box and pin of the portion of the connection of FIG. 1 adjacent the sealing surfaces when subjected to internal pressure and longitudinal tension with a groove located in one of the sealing surfaces positioned about midway between the ends of the threads as shown in FIG. 1.

Therefore, it was decided to locate a groove in the middle of surface 24 on the pin and see what happened to the stresses. The result is shown in FIG. 2. Under the same loads approximately the identical stresses were produced in the box and pin with no stress concentrations occurring around the groove 26, which is contrary to all expectations.

Therefore, a connection can be provided, such as that shown in FIG. 1, in which resilient seal ring 28 can be located in groove 26 about midway between the ends of sealing surface 24 to combine with the metal-to-metal seals formed on each side of the seal ring and provide three independent seals located between the steps of the connection without reducing the strength of the connection while improving substantially the integrity of the connection when subjected to both internal and external pressure.

The embodiment of the invention shown in FIGS. 4 and 5 includes pin 30 having external straight or cylindrical threads divided into large step 32 and small step 34. These threads mate with internal straight threads on box 36 that are divided into large step 38 and small step 40. Located between the steps are engaging tapered surfaces 42 and 44 that engage when the joint is made up to form metal-to-metal seals on opposite sides of seal ring 46 located in groove 48 located approximately in the middle of tapered surface 42 on the pin. Thus, the metal-to-metal seals on opposite sides of the seal ring trap the seal ring in the groove. The groove is located in a low stress area of the joint so that it provides an additional seal for the joint without weakening the joint.

This embodiment also includes tapered surface 50 on the end of the pin that engages tapered surface 52 on the box to provide an additional seal for the connection.

In both embodiments described above, preferably the helix angle of the smaller step should be advanced relative to the large step around 10° to insure that the threads of the small step make up before the threads of the large step.

From the foregoing it will be seen that this invention is one well adapted to attain all of the ends and objects hereinabove set forth, together with other advantages that are obvious and that are inherent to the apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. For use in forming a threaded pipe connection, a threaded tubular member adapted for connecting to another threaded member to form a threaded connection between the two members, said threaded tubular member comprising a tubular body, a projecting helical rib on the body forming screw threads for mating with the threads of the other threaded member to which the member is adapted to be connected, a conical sealing surface on the body to engage a conical sealing surface on the other threaded member, said sealing surface being located about midway between the ends of the threads, an annular groove in the conical sealing surface, and an annular member of resilient material located in the groove to engage the conical surface of the other threaded member and provide a seal as the two conical surfaces engage and form metal-to-metal seals on opposite sides of the groove.

2. The threaded tubular member of claim 1 in which the threads are tapered.

3. The threaded tubular member of claim 1 in which the threads are wedge-shaped and increase in width in one direction on the box and in the other direction on the pin.

4. The threaded tubular member of claim 1 in which the conical sealing surface tapers at an angle of 2°–4° from the longitudinal axis of the member.

5. The threaded tubular member of claims 1, 3, or 4 in which the threads on the member are tapered and are divided into a large step and a small step having a major diameter and a minor diameter smaller than the major and minor diameters of the large step and the conical sealing surface is located between the steps.

6. The threaded tubular member of claims 1, 3, or 4 in which the threads on the member are straight and are divided into a large step and a small step having a major diameter and a minor diameter smaller than the major and minor diameters of the large step and the conical sealing surface is located between the steps.

7. A well pipe joint including a box having internal threads and a pin having external threads for mating with the internal threads of the box to make up the joint, engaging conical sealing surfaces on the box and pin between the ends of the threads, one of said surfaces having an annular groove, and a seal ring located in the groove, said seal ring providing a seal between the box and pin and said engaging conical surfaces forming metal-to-metal seals on opposite sides of the seal ring when the joint is made up.

8. The pipe joint of claim 7 in which the threads are tapered.

9. The well pipe joint of claim 8 in which the threads are wedge-shaped and increase in width in one direction on the box and in the other direction on the pin.

10. The pipe joint of claim 7 in which the conical sealing surfaces taper at an angle of 2°–4° from the longitudinal axis of the joint.

11. The pipe joint of claims 7, 9, or 10 in which the threads on the member are tapered and are divided into a large step and a small step having a major diameter and a minor diameter smaller than the major and minor diameters of the large step and the conical sealing surfaces are located between the steps.

12. The pipe joint of claims 7, 9, or 10 in which the threads on the member are straight and are divided into a large step and a small step having a major diameter and a minor diameter smaller than the major and minor diameters of the large step and the conical sealing surfaces are located between the steps.

13. The pipe joint of claim 11 in which the threads are divided into a large step and a small step having a major diameter and a minor diameter smaller than the major and minor diameters of the large step, the conical sealing surfaces are located between the steps, and the helix angle of the threads of the small step is slightly advanced of the helix angle of the large step to insure that the small step threads always make up prior to the large step threads.

14. A threaded pipe comprising a box on one end having internal wedge-shaped threads that increase in width in one direction and a pin on the other end having external wedge-shaped threads that increase in width in the other direction, said threads on both the box and the pin being divided into a large step and a small step, said box and pin further having tapered sealing surfaces between the large and small steps on the box and pin for mating with similar sealing surfaces on a mating box and pin respectively when the pipe is connected into a pipe string, said surface on one of the box and pin having an annular groove to receive a seal ring of resilient material to be compressed between the groove and the mating sealing surface and provide a seal with the portions of the tapered sealing surface on opposite sides of the groove forming metal-to-metal seals with the mating surface.

15. In a well pipe joint including a box having internal tapered wedge-shaped threads that increase in width in one direction and a pin having external tapered wedge-shaped threads that increase in width in the opposite direction for mating with the internal threads of the box to make up and seal the joint, said threads on each member being divided into a large step and a small step, and mating sealing surfaces on the box and pin between the steps to further seal the joint, the improvement comprising an annular groove in the sealing surface of the pin to allow the portions of the surface on each side of the groove to form two independent metal-to-metal seals with the sealing surface of the box, and an annular seal member of resilient material located in the groove to be compressed between the groove and the sealing surface on the box to form a third independent seal between the pin and the box.

* * * * *